United States Patent Office 3,456,029
Patented July 15, 1969

3,456,029
PROCESS FOR THE PURIFICATION OF LOWER OLEFIN GASES
Shigeru Morita, Toshio Inoue, Hiromi Eto, and Kenichi Yoshimitsu, Fukuoka Prefecture, Japan, assignors to Yawata Chemical Industry Co., Ltd., Tokyo, Japan
No Drawing. Filed July 20, 1966, Ser. No. 566,466
Int. Cl. C07c 11/00, 11/24; B01j 11/74
U.S. Cl. 260—677                                    8 Claims

ABSTRACT OF THE DISCLOSURE

A process for the purification of a lower olefin gas which comprises removing and/or converting into easily removable materials harmful ingredients contained in the lower olefin gas such as acetylenes, diolefins, sulfur compounds and oxygen by subjecting the said gas to the two-stage catalytic treatment, wherein in the first catalytic treatment, molybdenum, cobalt-molybdenum or cobalt-tungsten is employed as the catalyst and in the second catalytic treatment nickel sulfide is successively employed as the catalyst.

---

This invention relates to a process for the purification of a lower olefin gas by subjecting the same to the two-stage catalytic hydrogenation. More particularly, it relates to a process for the purification of a lower olefin gas which comprises removing and/or converting into easily removable materials harmful ingredients contained in the lower olefin gas such as acetylenes, diolefins, sulfur compounds and oxygen by subjecting the said gas to the two-stage catalytic hydrogenation.

Cracking gases of various kinds such as, for example, coke oven gas, illuminating gas, oil gas and naphtha cracking gas contain usually from a few percent to a several tens percent of lower olefins such as ethylene and propylene. And olefin rich gases are obtained from these cracking gases by subjecting the cracking gases to a concentration procedure such as low temperature liquefaction, distillation, adsorption or extraction. The expression "lower olefin gas" refers to the gas which belongs to the said cracking gases or olefin rich gases and which contains about 20 to 95% by volume of lower olefins. Generally, such a lower olefin gas is marked by containing various harmful ingredients.

Though the composition of the lower olefin gas varies according to the composition of the raw gas, from which it is obtained, and/or the concentration procedure, the lower olefin gas contains usually, besides at least one of lower olefins, at least one of hydrogen, carbon monoxide and saturated hydrocarbons and further as harmful ingredients at least one of acetylenes such as acetylene and methyl acetylene; diolefins such as propadiene and butadiene; sulfur compounds such as hydrogen disulfide, carbon disulfide and carbonyl sulfide; nitrogen oxide; oxygen and the like.

An example of the composition of the ethylene fraction gas obtained from coke oven gas by subjecting the raw gas to the low temperature liquefaction is illustrated in the following table.

TABLE 1.—COMPOSITION OF ETHYLENE FRACTION GAS
[Unit—volume percent]

| Ingredient | Content | Ingredient | Content |
|---|---|---|---|
| $H_2$ | 2.5 | $C_3H_8$ | 0.9. |
| $O_2$ | 0.2 | $C_3H_6$ | 3.6. |
| $N_2$ | 0.9 | $1,3-C_4H_6$ | 0.3. |
| $CH_4$ | 43.3 | COS | 210 Smg./m.³* |
| CO | 1.4 | $CS_2$ | 90 Smg./m.³* |
| $C_2H_6$ | 13.2 | $C_4^+$ | 0.2. |
| $C_2H_4$ | 32.6 | $C_4^-$ | 0.4. |
| $C_2H_2$ | 0.6 | $C_5-C_8$ | 6 g./m.³ |

*Sm./gm.³ refers to an elementary sulfur-converted value.

The presence of sulfur compounds in the catalytic reaction of lower olefins frequently tends to reduce the activity of catalyst and promote the corrosion of plants. Further, the presence of acetylenes affects both the quality of desired products and the consumption of a catalyst in the reaction, for example, the reaction of ethylene and benzene, and forms an explosive compound by the reaction with a specific metal such as copper. Furthermore, sulfur compounds, nitrogen oxide and oxygen accelerate the polymerization reaction of unsaturated hydrocarbons, whereby resinous materials will be accumulated in reactors or pipelines to clog the apparatus.

In order to remove acetylenes among such harmful ingredients, there are provided selective hydrogenation and solvent extraction, and the former method has been usually adopted in industry.

As a catalyst for hydrogenating acetylenes selectively in the presence of lower olefins there are known palladium catalyst, nickel-cobalt-chromium catalyst and nickel catalyst.

However, in the known process by using palladium catalyst lower olefin gases available for the hydrogenation are restricted. Some kinds of lower olefin gases cannot be purified by the known process using palladium catalyst. That is, in the said known process a good result may be obtained when hydrogenating lower olefin gas which contains only acetylenes as the harmful ingredient, but in the case of hydrogenating the lower olefin gas which contains other harmful ingredients, for instance, sulfur compounds, the catalyst will be poisoned by the sulfur compounds. Therefore, in the said known process the lower olefin gas must be desulfurized prior to the hydrogenation, however, as shown below, it is very difficult to remove some sulfur compounds such as carbon disulfide and carbonyl sulfide due to their difficulty of being desulfurized.

As above mentioned, also nickel-cobalt-chromium has been used as a catalyst for the selective hydrogenation. This catalyst has a comparatively high resistance to sulfur compounds (cf., e.g. Arthur L. Kohl; "Gas Purification"; McGraw-Hill Book Co.; New York, 1960 and R. E. Reitmeier; "Chem. Eng. Prog."; 54, 48 (1958)). But it has been ascertained that the activity of the catalyst is rapidly reduced when treating the lower olefin gas which contains a large proportion of sulfur compounds (100–1000 mg./m.³ in calculated in terms of an element sulfur) and also oxygen and harmful ingredients. In this case, however, the behavior of the sulfur compounds in the hydrogenation is not yet clarified.

Further, nickel sulfide catalyst has been used for the selective hydrogenation of acetylene (cf.; Arthur W. Barry: U.S. Patent No. 2,511,453). It is said that the nickel sulfide catalyst has excellent activity as well as selectivity and also high resistance to sulfur compounds. However, it was shown by the experiments of the inventors of this invention that resinous materials were easily accumulated in the catalyst layer during the hydrogenation and hence the continuous operation of the hydrogenation had to be suspended after the lapse of only one month, because of the reactor being clogged thereby.

On the other hand, as a process for removing sulfur compounds in the lower olefin gas there has been usually practiced caustic-washing process. Although the said conventional process is effective in removing hydrogen sulfide, a complete removal of sulfur compounds such as carbon disulfide and carbonyl sulfide can scarcely be achieved by the caustic-washing process. Therefore, in the said process the lower olefin gas must be treated with an aqueous solution of alkanolamine such as monoethanolamine or diethanolamine. But even by the treatment with the aqueous alkanolamine solution sulfur compounds of such kinds as above mentioned can not completely be removed and further a loss of the expensive solvent is large, which results in an increase of the operation cost.

Besides the above mentioned processes there is proposed a catalytic desulfurization process. However, an effective catalytic desulfurization process, which can be carried out without causing a consumption of lower olefin gas, is not yet established.

As is understood from the above mentioned, though various catalytic processes for the purification of lower olefin gases have been proposed, there could be discovered no economic catalytic process which could remove from lower olefin gas containing various harmful ingredients such as acetylene, diolefins, organic sulfur compounds, nitrogen oxide and oxygen these harmful ingredients or at least can convert them into easily removable materials. Consequently, heretofore the lower olefin gases containing various harmful ingredients could not be utilized as chemical raw materials. The inventors of this invention have succeeded in establishing a process for the purification of lower olefin gases, whereby such lower olefin gas containing various harmful ingredients, as was not available heretofore in the conventional processes, can be effectively utilized as chemical materials.

Therefore, an object of this invention is to provide a novel process for the purification of a low olefin gas, particularly a lower olefin gas containing various harmful ingredients.

Other objects of this invention are to provide a process for removing and/or converting into easily removable materials the harmful ingredients in a lower olefin gas.

Still another object of this invention is to provide a process for removing and/or converting into easily removable materials the harmful ingredients of a lower olefin gas while securing the stable operation of a long period.

A further object of this invention is to provide a process for preparing the catalyst to be used in the process of this invention.

Other objects of this invention will become apparent from the following descriptions.

According to the process of this invention it has been discovered that by subjecting the lower olefin gas to the two-stage catalytic hydrogenation, wherein in the first catalytic hydrogenation molybdenum catalyst or cobalt-molybdenum catalyst or cobalt-tungsten catalyst is employed, and in the successive second catalytic hydrogenation nickel catalyst is employed, harmful ingredients in the lower olefin gas can be removed and/or converted into easily removable materials without trouble or clogging the apparatus.

In the first catalytic hydrogenation of this invention may be employed a commercially available molybdenum, cobalt-molybdenum or cobalt-tungsten catalyst. In particular, a molybdenum catalyst prepared by applying 3–20% by weight, preferably 5–15% by weight, of molybdenum oxide to a carrier, such as, diatomaceous earth, alumina, silica-alumina and the like or a cobalt-molybdenum catalyst prepared by applying further 0.5–10% by weight, preferably 1–5% by weight, of cobalt oxide to the above prepared molybdenum catalyst is suitable.

Further, as the nickel catalyst used in the second catalytic hydrogenation of this invention may be suitably used a catalyst prepared by applying 3–20% by weight, preferably 3–15% by weight, of nickel oxide to a carrier, such as, diatomaceous earth, alumina, silica-alumina and the like. The use of the nickel catalyst having such a low content of nickel has first been proposed by this invention.

In this case, it is recommended to prepare the nickel catalyst by calcinating. That is, the carrier impregnated with a nickel salt prepared by immersing the carrier in an aqueous of the nickel salt is dried and calcinated. The nickel catalyst prepared by calcinating is considered generally to have a poor reproducability of activity, which seems, however, so far made clear by the inventors of this invention, to be caused by the fact that the nickel salt, with which the carrier is impregnated, is transferred mainly to the surface of the catalyst during drying and calcinating, that is, the nickel salt is not uniformly dispersed. In such a catalyst, particularly, the active points are concentrated to the surface of the catalyst, resulting in causing the accumulation of undesirable resinous materials during reaction.

The nickel catalyst suitable for the second catalytic hydrogenation may be prepared as follows. That is, the carrier impregnated with a nickel salt in particular nickel nitrate is calcinated at a temperature of about 300–400° C., preferably about 350° C., until the weight of the carrier becomes constant, while introducing air or an inert gas such as nitrogen (preferably at a rate higher than 500 hr.$^{-1}$ in space velocity) by increasing the temperature at a rate of less than 50° C./hr. up to the temperature near the decomposition temperature of the nickel salt and then at a rate of less than 100° C./hr.

The catalysts used in the first hydrogenation as well as in the second hydrogenation are used in a sulfided state in the reaction system. The molybdenum cobalt-molybdenum catalyst in the first catalytic hydrogenation and the nickel catalyst in the second (they are usually in the state of oxide) may be firstly reduced and then sulfided or may be reduced and sulfided simultaneously. The latter is profitable from the viewpoint of the simplicity of operation. In the latter case, it is preferable for the sulfiding to pass through these catalysts hydrogen-hydrogen sulfide gas mixture containing less than 0.1 mol of hydrogen sulfide to 1 mol of hydrogen at a temperature of about 170–250° C. until the content of the hydrogen sulfide in the gas mixture reaches an amount, below which amount the content will substantially no more be reduced. The said gas mixture may be a gas containing, besides hydrogen and hydrogen sulfide, other gases such as nitrogen and methane, for example, a crude coke oven gas. It is recommended that the sulfided catalysts be treated by hydrogen. The hydrogen treatment is carried out by maintaining the sulfided catalysts for 0 to 150 hours at a temperature of about 170 to 250° C. in the presence of hydrogen. By thus objecting the sulfided catalysts to the hydrogen treatment the sulfur content of the catalysts can be controlled to be a constant value, so that they can be provided with activity and selectivity suitable for the catalysts in this invention.

The reaction conditions in the first and second catalysts hydrogenation stages of this invention are as follows:

The lower olefin gas to be subjected to the two-stage catalytic hydrogenation treatment of this invention sometimes contains a sufficient amount of hydrogen necessary for the catalytic hydrogenation treatment, but for the most part it does not contain sufficient amount of hydrogen. The amount of hydrogen prescribed in this invention is more than 5 mols per 1 mol of the acetylene present in the lower olefin gas and hence in the case where the content of hydrogen contained in the lower olefin gas is less than the amount prescribed, the hydrogen content in the lower olefin gas should be adjusted by adding a suitable amount of hydrogen or a hydrogen-containing gas. If the hydrogen content is less than 5 mols, a large amount of harmful ingredients, particularly acetylenes, will remain in the purified gases.

Moreover, in this invention it is recommended that the catalytic hydrogenation be carried out in the presence of 5 to 20% by volume of water vapor, because it has been confirmed that the presence of water vapor represses the formation of resinous materials and affects favorably the activity and the life of the catalysts.

In the first catalytic hydrogenation, the reaction temperature is about 170 to 270° C., the reaction pressure is atmospheric pressure to 20 kg./sq. cm.$^2$ G., and space velocity is about 500–2000 hr.$^{-1}$. The purpose of the first catalytic hydrogenation is to prevent the clogging of the catalyst layer by the accumulation of resinous materials in the second catalytic hydrogenation and further to remove or/and convert into easily removable materials a part of the harmful materials in the lower olefin gas. (cf., the composition of the lower olefin gas subjected to the first catalytic treatment in Example 1.) However, even if the conditions for the first catalytic hydrogenation would be made more severe than those of this invention, the object of this invention can not be achieved only by the first treatment, because the most part of acetylenes would remain in the final products (cf., Example 1). On the contrary, if the conditions of the first catalytic hydrogenation stage are made milder than those of this invention, the object of the first catalytic treatment will not be accomplished and hence the second catalytic hydrogenation will encounter with the trouble of the clogging of catalyst layers.

In the second catalytic hydrogenation, the reaction temperature is about 170 to 270° C., the reaction pressure is from atmospheric pressure to 20 kg./sq. cm.$^2$ G., and the space velocity is about 500–2000 hr.$^{-1}$ If the reaction temperature is less than 170° C., the amount of the remaining harmful ingredients will be increased even if the space velocity is reduced. On the other hand, if the reaction temperature is higher than 270° C., the lower olefins will be hydrogenated considerably. The pressure may be one higher than atmospheric pressure, but in order to increase the space velocity and diminish the amount of the remaining harmful ingredients, the pressure is preferable to be kept at about 10 to 20 kg./cm.$^2$ G.

If the conditions in the second catalytic hydrogenation are more severe than those specified by this invention, various side reactions such as the hydrogenation of the lower olefins and the formation of resinous materials will be occurred with a result of causing the troubles such as the clogging of catalyst layers and the reduction in the life of the catalyst. On the other hand, if the conditions are milder, a considerable proportion of the harmful ingredients, particularly acetylenes, will remain in the final product. Hence, the complete purification of the lower olefin gas will be accomplished.

In the two-stage catalytic hydrogenation of this invention it is confirmed that acetylenes and diolefins are selectively hydrogenated into the corresponding lower olefins, sulfur compounds such as carbon disulfide and carbonyl sulfide are converted into hydrogen sulfide, mercaptans, thioethers and sulfur-containing compounds of high boiling point, while the nitrogen oxides are converted into ammonia and nitrogen, and oxygen is hydrogenated into water.

Among the products, hydrogen sulfide and mercaptans are easily removable materials (for example, they can be easily removed by caustic washing) as compared with carbon disulfide, and carbonyl sulfide, thioethers, thiophenes and the high boiling point sulfur compounds can be removed as condensates by cooling the purified gas or can be easily removed by oil washing or charcoal adsorption.

The purified gas is, in proportion to the uses of the lower olefins in the gas, separated into desired fractions such as ethylene and propylene by known means such as a low-temperature fractional distillation or low-temperature liquefaction.

In order that this invention may be further understood the following examples are given by way of illustration:

EXAMPLE 1

(A) Preparation of nickel catalyst

Into pure water was dissolved 291 g. of nickel nitrate hexa-hydrate to provide 1 mol/liter of an aqueous nickel nitrate solution and in 1 liter of said aqueous solution was immersed 1 liter of a diatomaceous earth carrier (extrusion-molded pellet of 4 mm. in diameter and 4–6 mm. in length) followed by maintaining for 1 hour at room temperature under the reduced pressure of 100 mm. Hg. The carrier impregnated with nickel nitrate was recovered by filtration, heated in such manner that the temperature was increased up to 180° C. at a rate of 50° C./hr. and from 180° C. to the calcinating temperature of about 350° C. at a rate of 100° C./hr., and then maintained at the calcinating temperature for 5 hours. Thus prepared nickel-diatomaceous earth catalyst contained 5.3% by weight of NiO and it was observed that nickel was uniformly dispersed in the diatomaceous earth carrier.

(B) Purification of ethylene fraction gas

A reactor for the first catalytic treatment (hereinafter it is designated as the first reactor) and a reactor for the second catalytic hydrogenation (hereinafter it is designated as the second reactor) were charged with 800 ml. of a commercially available molybdenum-alumina catalyst (MoO content 13.5 by weight) and 400 ml. of the above-prepared nickel-diatomaceous earth catalyst respectively, and the catalysts were reduced and sulfided simultaneously by passing therethrough a hydrogen-hydrogen sulfide gas mixture containing 0.1 mol of hydrogen sulfide per 1 mol of hydrogen at a temperature of 220° C. for about 2.5 hours at a gas flow rate of 40 liter/hr., and then subjected to the hydrogen treatment by passing for 130 hours hydrogen gas at a flow rate of 36 liter/hr.

An ethylene fraction gas which had been obtained by subjecting a coke oven gas to a low-temperature liquefaction was mixed with a suitable amount of hydrogen and steam to prepare a gas containing 14 mols of hydrogen per 1 mol of acetylenes and 5% by volume of steam. Thus prepared gas was supplied into the above-mentioned first reactor at a rate of 720 liter/hr. The reaction in the first reactor was carried out at a temperature of 220° C., under a pressure of 17 kg./cm.$^2$ G. and at a space velocity of 900 hr.$^{-1}$. The gas withdrawn from the first reactor was thereupon introduced to the second reactor, in which the reaction was carried out under the conditions of a temperature of 200° C., a pressure of 17 kg./cm.$^2$ G. and a space velocity of 1800 hr.$^{-1}$. Thus, about 710 liter/hr. of the purified gas was obtained. The compositions of the ethylene fraction gases to be supplied into both reactors and of the purified gas are shown in Table 2, respectively.

TABLE 2
[Percent by volume]

| Ingredient | I | II | III |
|---|---|---|---|
| $H_2$ | 7.5 | 7.2 | 6.4 |
| $O_2$ | 0.2 | Below 6 p.p.m. | Below 6 p.p.m. |
| $N_2$ | 0.8 | 0.8 | 0.8 |
| $CH_4$ | 41.2 | 41.0 | 41.8 |
| CO | 1.4 | 1.4 | 1.4 |
| $C_2H_6$ | 12.5 | 12.7 | 12.9 |
| $C_2H_4$ | 31.1 | 31.7 | 31.9 |
| $C_2H_2$ | 0.5 | 0.3 | Below 7 p.p.m. |
| $C_3H_8$ | 0.9 | 0.9 | 0.9 |
| $C_3H_6$ | 3.4 | 3.4 | 3.4 |
| $1,3-C_4H_6$ | 0.3 | 0.3 | 0.2 |
| $C_4^+$ | 0.3 | 0.3 | 0.3 |
| $C_5^-$ | 0.4 | 0.4 | 1.4 |
| COS | 210 Smg./m.$^3$ | 11.6 Smg./m.$^3$ | Below 1 Smg./m.$^3$ |
| $CS_2$ | 90 Smg./m.$^3$ | 26.7 Smg./m.$^3$ | Below 0.5 Smg./m.$^3$ |

REMARKS.—(I) the composition of the ethylene fraction gas to be supplied into the first reactor; (II) the composition of the ethylene fraction gas to be introduced into the second reactor; (III) the composition of the purified gas, and the composition of the gases concerns the gas from which water and high-boiling oily matters condensing at room temperature have been separated (the lower olefin gas composition is same in the below examples).

This experiment was continued for 1300 hours but the activity of the catalyst was not reduced and no clogging was observed in the catalyst layers of both reactors.

EXAMPLE 2

(A) Preparation of nickel catalyst

The same procedure for the preparation of the nickel-diatomaceous earth catalyst as in Example 1 was repeated using 2 mol/liter of an aqueous nickel nitrate solution instead of 1 mol/liter thereof to provide the nickel-diatomaceous earth catalyst containing 9.8% by weight of NiO.

(B) Purification of ethylene fraction gas

The first and second reactors were charged with 800 ml. of the molydenum-alumina catalyst (same as in Example 1) and 800 ml. of the above-prepared nickel-diatomaceous earth catalyst respectively, and the catalysts were reduced and sulfided simultaneously by passing therethrough a hydrogen-hydrogen sulfide gas mixture containing 0.1 mol of hydrogen sulfide per 1 mol of hydrogen for about 6.5 hours at a temperature of 220 C. and at a gas velocity of 40 liter/hr. and then subjected to the hydrogen-activation treatment by passing a hydrogen gas for 125 hours at a temperature of 220° C and at a gas velocity of 72 liter/hr.

An ethylene fraction gas which had been obtained from a coke oven gas by a low-temperature liquefaction was mixed with a suitable amount of hydrogen and steam to provide a gas containing 20 mol of hydrogen per 1 mol of acetylenes and 10% by volume of steam. Thus prepared lower olefin gas was supplied into the first reactor at a gas velocity of 702 liter/hr. The reaction conditions in the first reactor were 220° C. in reaction temperature, 17 kg./cm.$^2$ G. in pressure and 900 hr.$^{-1}$ in space velocity. The gas withdrawn from the first reactor was thereupon introduced into the second reactor, in which the reaction was carried out at a temperature of 220° C., under a pressure of 17 kg./cm.$^2$ G. and at a space velocity of 900 hr.$^{-1}$. Thus, 687 liter/hr. of the purified gas was obtained. The compositions of the ethylene fraction gas to be supplied to the first reactor (I), the gas to be introduced into the second reactor (II) and the purified gas are shown in Table 3 respectively.

TABLE 3
[Percent by volume]

| Ingredient | I | II | III |
| --- | --- | --- | --- |
| $H_2$ | 12.1 | 11.5 | 11.0 |
| $O_2$ | 0.1 | Below 16 p.p.m. | Below 16 p.p.m. |
| $N_2$ | 1.0 | 1.0 | 1.0 |
| $CH_4$ | 34.3 | 34.3 | 34.5 |
| $CO$ | 1.4 | 1.4 | 1.4 |
| $C_2H_6$ | 14.6 | 14.6 | 15.5 |
| $C_2H_4$ | 30.6 | 31.1 | 30.6 |
| $C_2H_2$ | 0.6 | 0.2 | Below 0.2 p.p.m. |
| $C_3H_8$ | 1.1 | 1.1 | 1.1 |
| $C_3H_6$ | 4.2 | 4.2 | 4.2 |
| $1,3-C_4H_6$ | 0.3 | 0.3 | 0.04 |
| $C_4^+$ | 0.1 | 0.1 | 0.1 |
| $C_4^-$ | 0.4 | 0.5 | 0.6 |
| $COS$ | 219 Smg./m.$^3$ | Below 1 Smg./m.$^3$ | Below 1 Smg./m. |
| $CS_2$ | 65 Smg./m.$^3$ | 1.4 Smg./m.$^3$ | Below 0.5 Smg./m. |

This experment was continued for 2400 hours but the activity of the catalyst was not reduced and no clogging was observed in the catalyst layers in both reactors.

EXAMPLE 3

In this example, the ethylene fraction gas was purified by the same manner as in Example 1 while using a cobalt-molybdenum catalyst in the first catalytic treatment instead of the molybdenum catalyst.

That is, the first and second reactors were charged with 800 ml. of a commercially available cobalt-molybdenum catalyst (CoO content 3% by weight $MoO_3$ content 15% by weight) and 400 ml. of the nickel-diatomaceous earth catalyst same as prepared in Example 1 respectively, and then the reduction-sulfurization and hydrogen-treamtent were applied to the catalysts by the same manner as in Example 1.

The ethylene fraction gas was mixed with a suitable amount of hydrogen and steam to provide a lower olefin gas containing 13 mols of hydrogen per 1 mol of acetylene and 10% by volume of steam and thus prepared gas was supplied into the first reactor at a velocity of 720 liter/hr. The reaction conditions for the first catalytic hydrogenation treatment were 220° C. in reaction temperature, 17 kg./cm.$^2$ G. in reaction pressure and 900 hr.$^{-1}$ in space velocity. The reaction conditions for the second catalytic hydrogenation next to the first were 200° C. in reaction temperature, 17 kg./cm.$^2$ G. in reaction pressure and 1800 hr.$^{-1}$ in space velocity. Thus, 711 liter/hr. of a purified gas was obtained. The compositions of the ethylene fraction gas to be supplied into the first reactor (I) and second reactor (II) and the composition of the purified gas (III) are shown in Table 4.

TABLE 4
[Percent by volume]

| Ingredient | I | II | III |
| --- | --- | --- | --- |
| $H_2$ | 9.3 | 8.9 | 8.1 |
| $O_2$ | 0.2 | Below 6 p.p.m. | Below 6 p.p.m. |
| $N_2$ | 2.0 | 1.9 | 1.8 |
| $CH_4$ | 37.2 | 37.5 | 37.7 |
| $CO$ | 1.6 | 1.6 | 1.6 |
| $C_2H_6$ | 13.4 | 13.6 | 13.8 |
| $C_2H_4$ | 31.6 | 32.0 | 32.4 |
| $C_2H_2$ | 0.7 | 0.5 | Below 1 p.p.m. |
| $C_3H_8$ | 0.3 | 0.3 | 0.3 |
| $C_3H_6$ | 3.4 | 3.4 | 3.4 |
| $1,3-C_4H_6$ | 0.3 | 0.3 | 0.2 |
| $C_4^+$ | 0.2 | 0.2 | 0.2 |
| $C_4^-$ | 0.6 | 0.6 | 0.8 |
| $COS$ | 161 Smg./m.$^3$ | 5.4 Smg./m.$^3$ | Below 1 Smg./m.$^3$ |
| $CS_2$ | 72 Smg./m.$^3$ | 2.8 Smg./m.$^3$ | Below 0.5 Smg./m.$^3$. |

This experiment was continued for about 1300 hours but the activity of the catalysts was not reduced and no clogging was observed in the catalyst layers in both reactors.

EXAMPLE 4

(A) Preparation of nickel catalyst

The same procedure for the preparation of the nickel-diatomaceous earth as in Example 1 was repeated using 1.5 mol/liter of an aqueous nickel nitrate solution instead of 1 mol/liter thereof to provide the nickel-diatomaceous earth catalyst containing 7.1% by weight of NiO.

(B) Purification of ethylene fraction gas

The first and second reactors were charged with 400 ml. of the molybdenum-alumina catalyst (same as in Example 1) and 200 ml. of the above-prepared nickel-diatomaceous earth catalyst respectively, and the catalysts were reduced and sulfided simultaneously for about 3 hours with the hydrogen-hydrogen sulfide gas mixture and then subjected to the hydrogen treatment for about 90 hours with hydrogen gas under the same conditions as in Example 1.

The ethylene fraction gas was mixed with a suitable amount of hydrogen to provide a gas containing 10 mol of hydrogen per 1 mol of acetylenes, and the thus prepared gas was supplied into the first reactor at a velocity of 360 liter/hr. The reaction conditions in the first and second catalytic hydrogenation stages were 220° C. in reaction temperature, 17 kg./cm.$^2$ G. in reaction pressure and 900 hr.$^{-1}$ (first catalytic hydrogenation) and 1800 hr.$^{-1}$ (second catalytic hydrogenation) in space velocity. Thus, 356 liter/hr. of a purified gas was obtained. The compositions of the ethylene fraction gas to be supplied to the first reactor (I) and the second reactor (II) and the composition of the purified gas (III) are shown in Table 5.

TABLE 5
[Percent by volume]

| Ingredient | I | II | III |
| --- | --- | --- | --- |
| $H_2$ | 6.5 | 6.1 | 5.2 |
| $O_2$ | 0.2 | Below 6 p.p.m. | Below 6 p.p.m. |
| $N_2$ | 2.6 | 2.6 | 2.6 |
| $CH_4$ | 41.2 | 41.5 | 41.7 |
| $CO$ | 1.7 | 1.7 | 1.8 |
| $C_2H_6$ | 12.3 | 12.5 | 12.8 |
| $C_2H_4$ | 30.9 | 31.1 | 31.3 |
| $C_2H_2$ | 0.6 | 0.5 | 1.5 p.p.m. |
| $C_3H_8$ | 0.7 | 0.7 | 0.7 |
| $C_3H_6$ | 2.8 | 2.9 | 3.0 |
| $1,3-C_4H_6$ | 0.3 | 0.3 | 0.9 |
| $C_4^+$ | 0.2 | 0.2 | 0.2 |
| $C_4^-$ | 0.3 | 0.3 | 0.6 |
| $COS$ | 250 Smg./m.$^3$ | 67 Smg./m.$^3$ | Below 1 Smg./m. |
| $CS_2$ | 99 Smg./m.$^3$ | 49 Smg./m.$^3$ | Below 0.5 Smg./m. |

In this experiment, wherein steam was not added to the ethylene fraction gas, the removal percentage of acetylene and the conversion percentage of sulfur compounds in the first catalytic hydrogenation were low as compared with those of Example 1 wherein steam was added to the ethylene fraction gas. Further, since the catalyst layer in the second reactor was clogged after the continuous operation of the experiment for 680 hours, the experiment had to be stopped.

REFERENCE EXAMPLE 1

In the reference example, the purification of ethylene fraction gas was conducted using only a molylbdenum catalyst in one-stage catalytic treatment.

A reactor was charged with 400 ml. of the commercially available molybdenum-alumina catalyst (same as in Example 1), and the catalyst was reduced and sulfided simultaneously by passing therethrough a hydrogen-hydrogen sulfide gas mixture containing 0.1 mol of hydrogen sulfide per 1 mol of hydrogen for about 2.5 hours at a temperature of 220° C. and a gas velocity of 40 liter/hr. and then subjected to the hydrogen treatment by passing therethrough hydrogen gas for about 90 hours at a velocity of 36 liter/hr.

The ethylene fraction gas was mixed with a suitable amount of hydrogen and steam to provide a gas containing 20 mols of hydrogen per 1 mol of acetylenes and 5% by volume of steam, and the resulting gas mixture was introduced into the reactor at a gas velocity of 720 liter/hr. The reaction conditions in the catalytic treatment were 220° C. in reaction temperature, 17 kg./cm.$^2$ G. in reaction pressure and 1800 hr.$^{-1}$ in space velocity. Thus, about 780 liter/hr. of a purified gas was obtained. The compositions of the ethylene fraction gas to be introduced to the reactor and the purified gas are shown in Table 6.

The experiment was continued for 840 hours. The harmful ingredients were almost removed and/or converted at the beginning of the reaction, however, 25% of acetylenes remained in the purified gas after 75 hours and 60% after 260 hours. But, oxygen was removed to be below 6 p.p.m., and no clogging was observed in the catalyst layer.

TABLE 6
[Percent by volume]

| Ingredient | Composition of ethylene fraction gas | Composition of refined gas |
|---|---|---|
| $H_2$ | 8.3 | 8.4 |
| $O_2$ | 0.2 | Below 6 p.p.m. |
| $N_2$ | 1.9 | 1.8 |
| $CH_4$ | 39.9 | 39.9 |
| $CO$ | 1.5 | 1.5 |
| $C_2H_6$ | 14.1 | 14.4 |
| $C_2H_4$ | 31.7 | 32.2 |
| $C_2H_2$ | 0.4 | 0.3 |
| $C_3H_8$ | 1.0 | 0.9 |
| $C_3H_6$ | 3.5 | 3.5 |
| $1,3$-$C_4H_6$ | 0.3 | 0.3 |
| $C_4^+$ | 0.5 | 0.5 |
| $C_4^-$ | 0.4 | 0.4 |
| $COS$ | 233 Smg./m.$^3$ | 18 Smg./m.$^3$ |
| $CS_2$ | 87 Smg./m.$^3$ | 43 Smg./m.$^3$ |

REFERENCE EXAMPLE 2

In this example, the purification of ethylene fraction gas was conducted using only a nickel catalyst in a one-stage catalytic hydrogenation.

The nickel-diatomaceous earth catalyst same as in Example 3 was charged into a reactor, reduced and sulfided simultaneously for about 2.5 hours by passing through it a hydrogen-hydrogen sulfide gas mixture containing 0.1 mol of hydrogen sulfide per 1 mol of hydrogen at a temperature of 220° C. and at a gas velocity of 40 liter/hr., and then subjected to the hydrogen treatment by passing a hydrogen gas for 40 hours at a velocity of 36 liter/hr.

The ethylene fraction gas was mixed with a suitable amount of hydrogen to provide a gas containing 15 mols per 1 mol of acetylene and then introduced into the reactor. The reaction was carried out under the same conditions as Reference Example 1.

By this treatment, acetylene were removed to be below 1 p.p.m. and almost no carbon disulfide and carbonyl sulfide, but since the catalyst layer was clogged after the continuous operation for a period of 200 hours, the experiment had to be suspended.

What we claim is:

1. A process for the purification of a lower olefin gas containing various harmful ingredients including acetylenes which comprises regulating the hydrogen content in the lower olefin gas to at least 5 mols per one mol of acetylenes in the said lower olefin gas, subjecting the said gas to a first catalytic hydrogenation in the presence of a catalyst composed of a sulfide of metal selected from the group consisting of molybdenum, cobalt-molybdenum and cobalt-tungsten as an essential ingredient at a temperature of 170 to 250° C. under the pressure of atmosphere to 20 kg./cm.$^2$ G. and at a space velocity of 500 to 2000 hr.$^{-1}$ and thereupon subjecting the thus treated olefin gas to a second catalytic hydrogenation in the presence of a catalyst composed of nickel sulfide as an essential active ingredient at a temperature of 170 to 270° C. under the pressure of atmosphere to 20 kg./cm.$^2$ G. and at a space velocity of 500 to 2000 hr.$^{-1}$.

2. The process claimed in claim 1, in which the lower olefin gas is a gas which is selected from a group consisting of a cracking gas such as cake oven gas, illuminating gas, oil gas and naphtha cracking gas, and an olefin rich gas obtained from the said cracking gas and which contains 20 to 95% by volume of lower olefins.

3. The process claimed in claim 1, wherein the first and second catalytic hydrogenation are carried out in the presence of 5 to 20% by volume of water vapor.

4. The process claimed in claim 1, wherein the sulfided catalysts are subjected to a hydrogen treatment by maintaining the said catalysts at a temperature of about 170 to 250° C. in the presence of hydrogen so long as the sulfur content of the catalysts becomes constant.

5. The process claimed in claim 1, wherein the nickel catalyst is used, prepared by calcinating a carrier impregnated with a nickel salt while introducing into the calcinating system the air in such manner that the temperature is increased from room temperature to a temperature near the decomposition point of said nickel salt at a rate of less than 50° C./hr. and further from about the decomposition temperature of the nickel salt to 300–400° C., preferably about 350° C. at a rate of less than 100° C./hr., and then the carrier is maintained at the calcinating temperature until the weight of the carrier becomes constant.

6. The process claimed in claim 5, wherein the nickel catalyst contains 3 to 20% by weight of nickel calculated as nickel oxide.

7. The process claimed in claim 5, wherein the nickel salt is nickel nitrate.

8. The process claimed in claim 5, wherein an inert gas is introduced into the calcinating system.

References Cited

UNITED STATES PATENTS

| 2,236,216 | 3/1941 | Lyman et al. | 208—215 |
| 2,464,539 | 3/1949 | Voorhies et al. | 252—439 |
| 2,878,179 | 3/1959 | Hennig | 208—57 |
| 3,167,497 | 1/1965 | Solomon | 252—439 |

FOREIGN PATENTS

| 1,111,614 | 7/1961 | Germany. |
| 646,408 | 11/1950 | Great Britain. |

HERBERT LEVINE, Primary Examiner

U.S. Cl. X.R.

208—57; 252—439